United States Patent
Andrade et al.

(10) Patent No.: US 10,244,017 B2
(45) Date of Patent: Mar. 26, 2019

(54) PROCESSING OF STREAMING DATA WITH A KEYED JOIN

(75) Inventors: Henrique Andrade, Hawthorne, NY (US); Mitchell A. Cohen, Hawthorne, NY (US); Bugra Gedik, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1225 days.

(21) Appl. No.: 12/541,465

(22) Filed: Aug. 14, 2009

(65) Prior Publication Data

US 2011/0040887 A1 Feb. 17, 2011

(51) Int. Cl.
H04L 29/06 (2006.01)

(52) U.S. Cl.
CPC .......... *H04L 65/4076* (2013.01); *H04L 65/80* (2013.01)

(58) Field of Classification Search
CPC ....................................................... H04L 43/04
USPC ........................................................ 709/231
See application file for complete search history.

(56) References Cited

U.S. PATENT DOCUMENTS

| | | | |
|---|---|---|---|
| 5,790,779 A | 8/1998 | Ben-Natan et al. | |
| 7,010,538 B1 * | 3/2006 | Black | G06F 17/30516 707/636 |
| 7,062,681 B2 | 6/2006 | Larsson et al. | |
| 7,139,938 B2 | 11/2006 | Marwaha | |
| 7,289,988 B2 | 10/2007 | Joseph | |
| 7,331,527 B2 | 2/2008 | Mo et al. | |
| 2005/0010545 A1 * | 1/2005 | Joseph | 707/1 |
| 2005/0171833 A1 * | 8/2005 | Jost et al. | 705/10 |
| 2006/0248219 A1 * | 11/2006 | Astley et al. | 709/233 |
| 2008/0114853 A1 | 5/2008 | Holt | |
| 2008/0183304 A1 * | 7/2008 | Lee et al. | 700/3 |
| 2008/0189352 A1 * | 8/2008 | Mitchell | G06F 9/542 709/201 |
| 2008/0263062 A1 | 10/2008 | Klein et al. | |
| 2008/0263096 A1 | 10/2008 | Klein et al. | |
| 2008/0301135 A1 * | 12/2008 | Alves et al. | 707/6 |
| 2009/0113437 A1 | 4/2009 | Sedukhin et al. | |
| 2009/0287628 A1 * | 11/2009 | Indeck et al. | 706/47 |
| 2010/0235528 A1 * | 9/2010 | Bocharov | H04N 21/6437 709/231 |
| 2011/0040734 A1 | 2/2011 | Andrade et al. | |
| 2011/0041133 A1 | 2/2011 | Amini et al. | |

OTHER PUBLICATIONS

Gedik et al., "SPADE: The System S Declarative Stream Processing Engine," SIGMOD '08, Jun. 9-12, 2008, Vancouver, BC, Canada.
Office Action for U.S. Appl. No. 12/541,481 (U.S. Publication No. 2011/0040734) dated Sep. 21, 2011.

(Continued)

*Primary Examiner* — Suraj M Joshi
*Assistant Examiner* — Sherman Lin
(74) *Attorney, Agent, or Firm* — Kurt P. Goudy; Matthew M. Hulihan; Heslin Rothenberg Farley & Mesiti PC

(57) ABSTRACT

A keyed join is used in the processing of streaming data to streamline processing to provide higher throughput and decreased use of resources. The most recent event for each unique replacement key value(s) is maintained substituting older events with the same key. An incoming event is joined with the data received from one or more other data sources, and the correlations are output.

19 Claims, 9 Drawing Sheets

(56) References Cited

OTHER PUBLICATIONS

Office Action for U.S. Appl. No. 12/541,435 (U.S. Publication No. 2011/0041133) dated Jan. 30, 2012.
Office Action for U.S. Appl. No. 12/541,481, dated Oct. 2, 2013, pp. 1-12.
Notice of Allowance for U.S. Appl. No. 12/541,435, dated Jul. 18, 2012, pp. 1-24.
Final Office Action for U.S. Appl. No. 12/541,481 dated Apr. 18, 2014, pp. 1-9.

* cited by examiner

PROCESSING OF STREAMING DATA WITH A KEYED JOIN

BACKGROUND

This invention relates, in general, to processing streaming data, and, in particular, to improving processing of such data.

Processing within a data processing system can include various forms, including non-stream processing and stream processing. In non-stream processing, data is received, saved and later processed. In contrast, in stream processing, data is processed, as it is continuously received.

Examples of stream processing systems include large scale sense-and-respond systems, which continuously receive external signals in the form of one or more streams from multiple sources and employ analytics aimed at detecting critical conditions and, ideally, responding in a proactive fashion. Examples of such systems abound, ranging from systems deployed for monitoring and controlling manufacturing processes, power distribution systems, and telecommunication networks, to environmental monitoring systems, to algorithmic trading platforms, etc. These sense-and-respond systems share the need for:

(1) calculating baselines for multiple samples of incoming signals (e.g., instantaneous electricity production levels, the fair price of a security, among others); and/or
(2) correlating the computed value for a signal with other signals (e.g., instantaneous electricity consumption levels, the ask price of a security, among others).

This paradigm of streaming analytics focuses on incremental processing as data is received from external sources. This differs from the typical store-and-process paradigm (e.g., non-stream processing) that answers queries by processing the needed data for that query at the time the query is issued. The advantage of incremental processing is the availability of analysis results with low latency and high throughput.

BRIEF SUMMARY

Although stream processing systems are capable of ingesting data from high speed data feeds, the amount of data output by these systems may be overwhelming to those systems that are to receive the output and the amount of data processed and resources consumed may be excessive. To limit the computing resources required for a workload, a need exists for a capability that decreases the processing of streaming data. A further need exists for a capability that decreases the use of computational resources in processing the incoming data.

The shortcomings of the prior art are overcome and additional advantages are provided through the provision of a computer program product for processing streaming data. The computer program product comprises a computer readable storage medium for execution by a processing circuit for performing a method. The method includes, for instance, receiving a stream of data; determining whether a new event of the stream of data has a key which is the same key as a previous event being currently maintained as a stored event; in response to determining the new event has the same key as the previous event, replacing the previous event with the new event as the stored event; checking whether the new event is to be joined with another event; in response to the checking indicating the new event is to be joined, joining the new event and the another event to provide a joined event, wherein, in response to the replacing, the event being joined is an updated event; and outputting the joined event.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for improving processing of streaming data by employing a keyed join operator that uses replacement of older information with more recent information. A capability is provided for correlating (i.e., joining) the values from one or more streams of data. This correlating is possible when, for example, there is a flow of events (e.g., records, tuples) where some events are for the same entity as previous events and they replace those previous events and the replaced events no longer factor in the correlations.

As one example, the most recent event for each unique replacement key value(s) for each data source is maintained, each incoming event is joined with the data received from one or more other data sources and the correlations are output. In one example, the event being joined is an updated event, since that event replaced a previous event having a same key as the event being joined.

Figure 1:
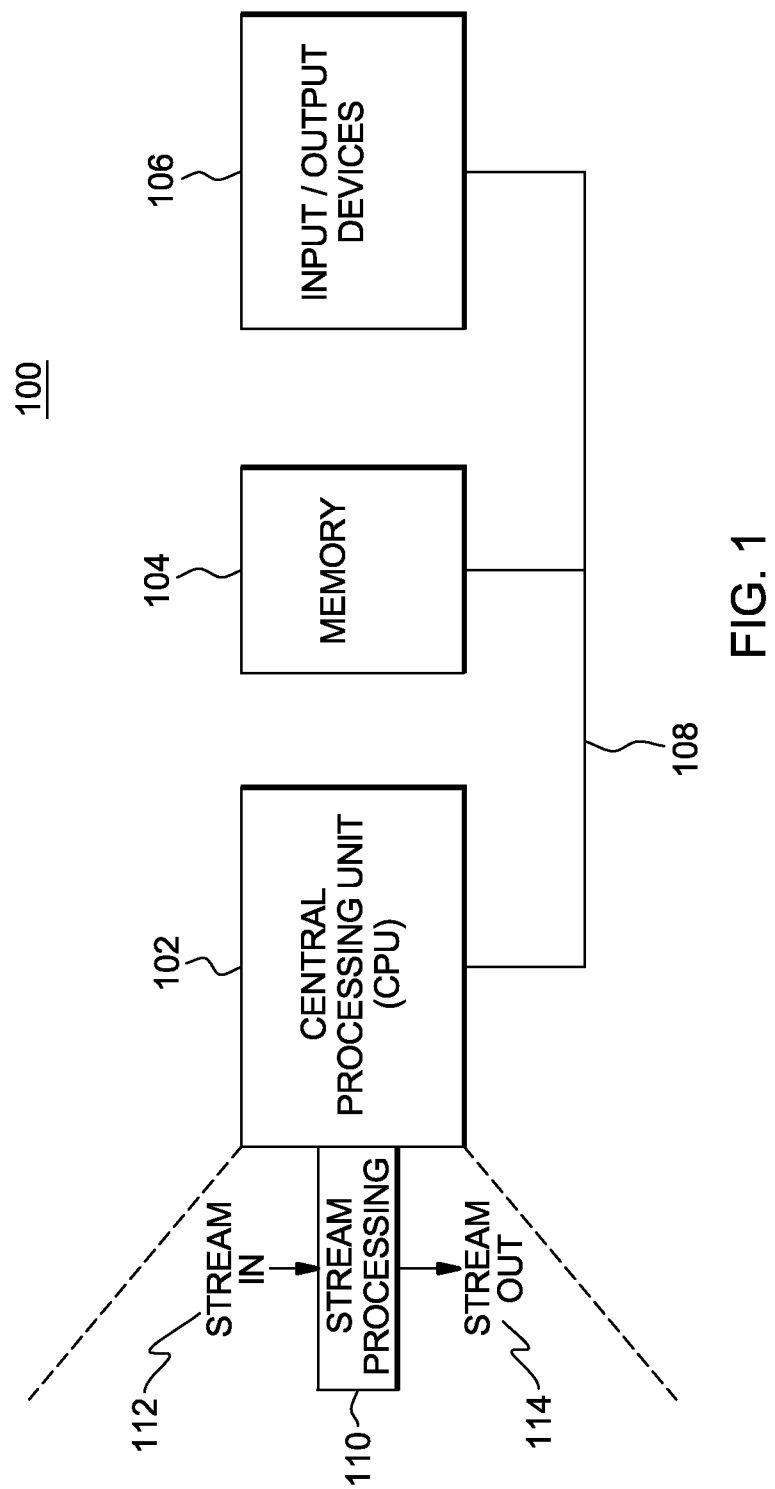
FIG. 1 depicts one embodiment of a data processing system to incorporate and use one or more aspects of the present invention.

One embodiment of a data processing system to incorporate and use one or more aspects of the present invention is described with reference to FIG. 1. In this example, a data processing system 100 includes, for instance, a processor 102 (e.g., a central processing unit (CPU)), a memory 104 (e.g., main memory), and one or more input/output (I/O) devices 106, coupled to one another via, for example, one or more buses 108. As an example, processor 102 is an x86 processor offered by Intel® Corporation, Santa Clara, Calif. Processor 102 may execute an operating system, as well as applications or logic to perform one or more tasks. In one example, processor 102 executes stream processing logic 110 to implement one or more aspects of the present invention. Intel® Corporation is a registered trademark of Intel® Corporation, Santa Clara, Calif., U.S.A. Other names used herein may be registered trademarks, trademarks or product names of International Business Machines Corporation or other companies. In embodiments of the invention, stream processing logic may be comprised of a group of operators, each of which may be software that executes on a processor such as processor 102 to perform one or more functions, including providing an output stream to a next operator. In embodiments, one of the operators may be a keyed time delay operator 201 as discussed below with reference to FIG. 2. As shown in FIG. 1, an input stream of events 112, in this example shown as events 200-210, may be provided to stream processing logic 110 and keyed time delay operator 201, which may output a stream of events 114, in this example shown as 208 and 212.

The data processing system described above, as well as other data processing systems, is capable of handling high volume streaming event processing. With such processing, there are situations where many incoming events are providing updated information about the same item. If these similar events arrive within a short time from one another, they cause much extra processing on the system either requiring greater computer resources or increasing the latency in providing results. As an example, a financial market ticker could have, for instance, ten consecutive ticks for a single stock within one microsecond. In this situation, it is often the case that the only tick that is necessary is the last one. If all the others are processed, then ten times the amount of work is performed with no improvement in accuracy of computation results. Thus, in accordance with an aspect of the present invention, only the last one, at a defined time, is processed. This is described in further detail below.

For clarity, examples herein are described that relate to stocks and related information; however, these are only examples. There are many other events that can be similarly processed and these events are considered within the scope of the present invention. As one example, an entity may be a stock ticker symbol having a unique key, and all events for that entity may include that same key of the entity (i.e., the events have the same key).

One particular stock market example is depicted and described with reference to FIG. 2. This figure shows the output produced based on a sample input and a keyed join operator. As an example, the input includes events that arrive one-by-one in streaming fashion from two different data sources. The first input data source is located on the left of the figure, and the second input data source is located on the right of the figure. The output, located in the middle of the figure, also includes events being sent out in streaming fashion. The events in both the input and output are shown in their respective orders with the top records depicted first.

The example shows correlation being performed on orders to trade financial securities in an exemplary financial market application and the corresponding prices of these financial securities. Each order may have one or more events coming in, where newer events replace the information previously given for the specified order. Each order has a unique identifier, the attribute "Order ID." Each order is for a single specific financial security. The order events have two additional attributes: the "Num Fulfilled," which is the quantity of items (i.e., number of shares of a security to acquire) for the order that has been fulfilled, and the "Num Open," which is the quantity of items for the order that have not yet been fulfilled.

Each financial security price data represents a new price for a specific financial security. Each financial security may have one or more price events coming in, where newer events replace the information previously given for the specified security. The financial security has two attributes, in which each event has a unique identifier, the "Symbol," and each event on the data source has a "Price."

In the top center of the figure, a keyed join operator 200 is depicted, which includes its specific description for this example:
  A replacement key for the first data stream of "Order ID;"
  A replacement key for the second data stream of "Symbol;"
  A join (i.e., correlation) condition stating the first data stream's "Symbol" is to match the second data stream's "Symbol;"
  A removal condition for the first data stream stating the correlation should be removed when the "NumOpen" is zero (i.e., the order has been completely fulfilled);
  A removal condition for the second data stream is "none"—in other words, it does not exist; and
  An output specification of "ALL" meaning that all attributes should be output (as opposed to a list of specific attributes).

The join condition defines how events from the two streams are correlated. Based on the condition in this example, when a new event arrives on either data stream, it is matched up with the most recent record with the same symbol from the other data stream.

In this example, there are inputs from both data streams that do not cause any output upon their arrival (i.e., no matching "Symbol" has been received on the other stream). The arrival of an event on the first input data stream can cause at most one output event for a particular order for which there can be no more than one most-recent price. The arrival of an event on the second input stream can cause multiple output events to be created, as a "Price" for a "Symbol" matches all the orders open for that "Symbol." The circles in FIG. 2 specify the order of the sample input records and the corresponding output records.

Figure 2:
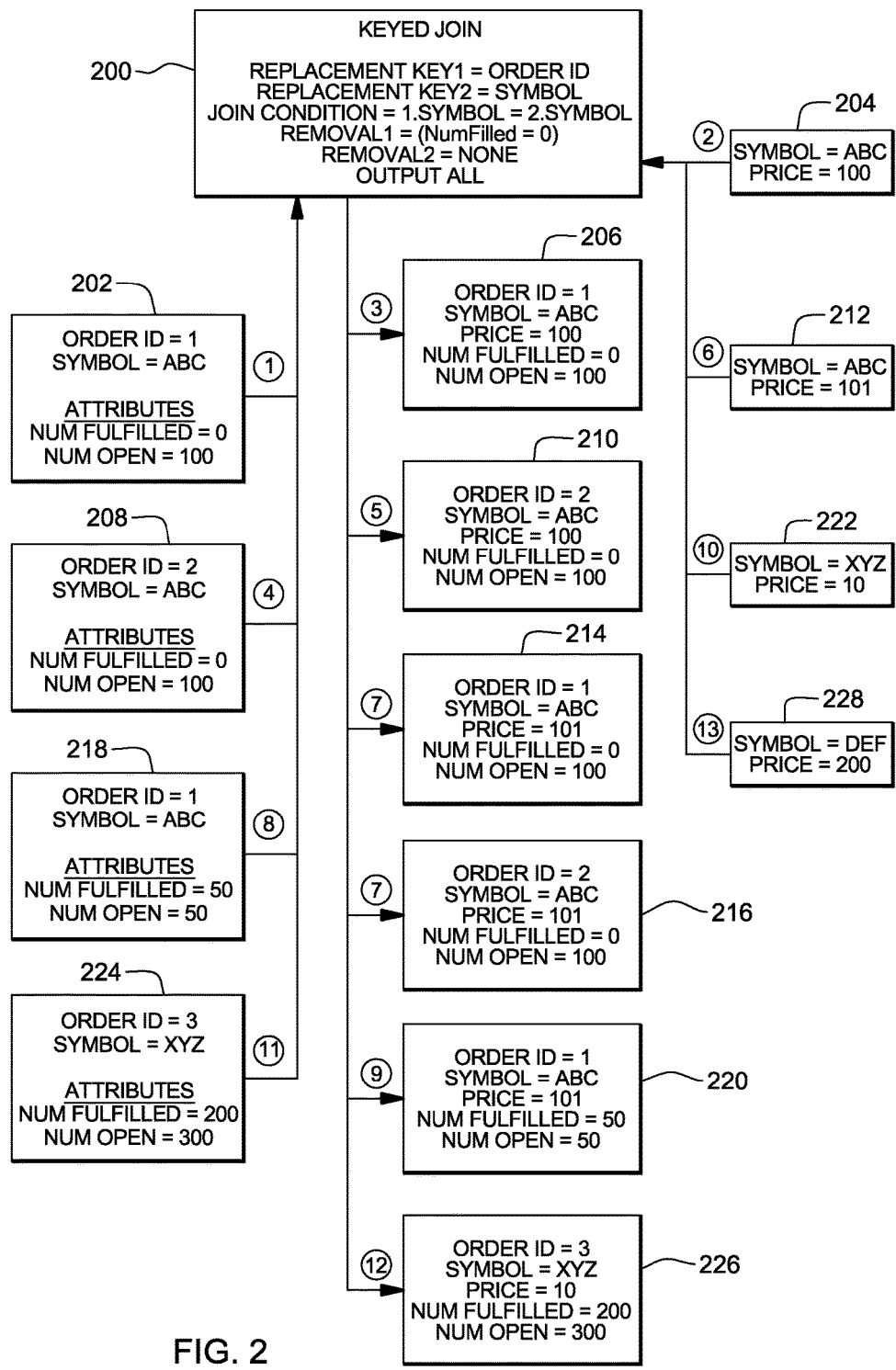
FIG. 2 depicts one example of the output produced using a keyed join operator on a specific sample input, in accordance with an aspect of the present invention.

Referring to FIG. 2, at 1, an event for an order with ID of 1 for symbol ABC with 0 items having already been fulfilled and 100 items still open arrives (202). As no price has yet been received for symbol ABC, no records are output.

At 2, an event for the price of symbol ABC arrives with a price of 100 (204). This event arrival causes a correlation match with Order 1. Thus, at 3, an event is output with the attributes from both sources (206). For example, the output includes: Order ID=1; Symbol=ABC; Price=100; Num Fulfilled=0; Num Open=100.

At 4, an event for order with ID of 2 for symbol ABC arrives with 0 items having already been fulfilled and 100 items still open (208). The event arrival causes a correlation match with the most recent price received for symbol ABC. Thus, at 5, an event is output with the attributes from both sources (210).

At 6, an event for the price of symbol ABC arrives with a price of 101 (212). The event arrival causes a correlation match with both Orders 1 and 2. Thus, at 7, two corresponding events are output (214, 216).

At 8, an event for order with ID of 1 for symbol ABC with 50 items having already been fulfilled and 50 items still open arrives (218). In the operator's internal state, the information in this event replaces that of the previous event received for Order 1. The event arrival causes a correlation match with the most recent price received for symbol ABC. Thus, at 9, an event is output with the attributes from both sources (220). It is shown that only the most recent data is output.

At 10, an event for the price of symbol XYZ arrives with a price of 10 (222). As no order events have been received for this symbol, no events are output.

At 11, an event for order with ID of 3 for symbol XYZ with 200 items having already been fulfilled and 300 items still open arrives (224). The event arrival causes a correlation match with the most recent price received for symbol XYZ. Thus, at 12, an event is output with the attributes from both sources (226).

At 13, an event for the price of symbol DEF arrives with a price of 200 (228). As no order events have been received for this symbol, no events are output.

Figure 3A:
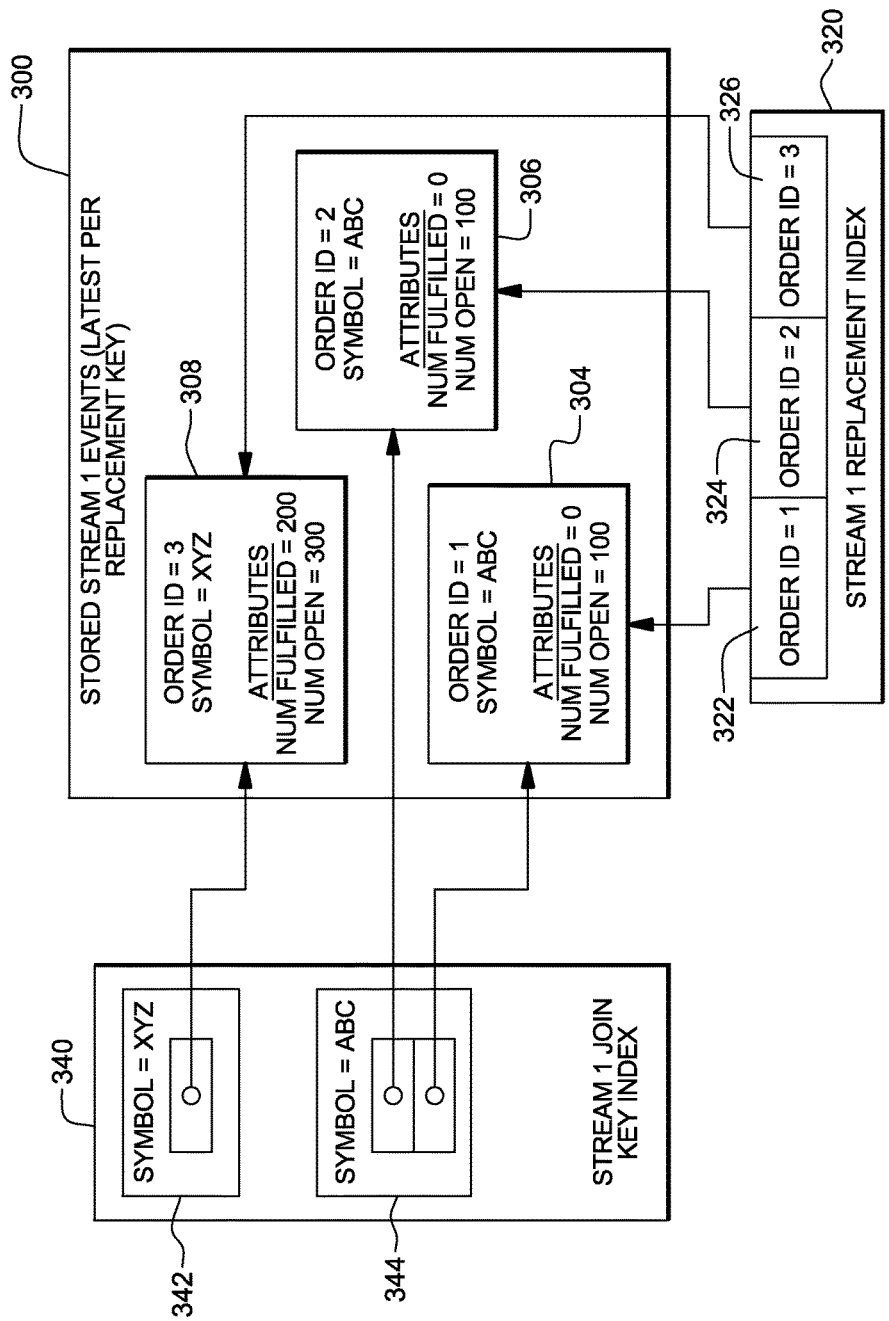
FIGS. 3A-3B depict examples of data structures used to implement a keyed join operator, in accordance with an aspect of the present invention.
Figure 3B:
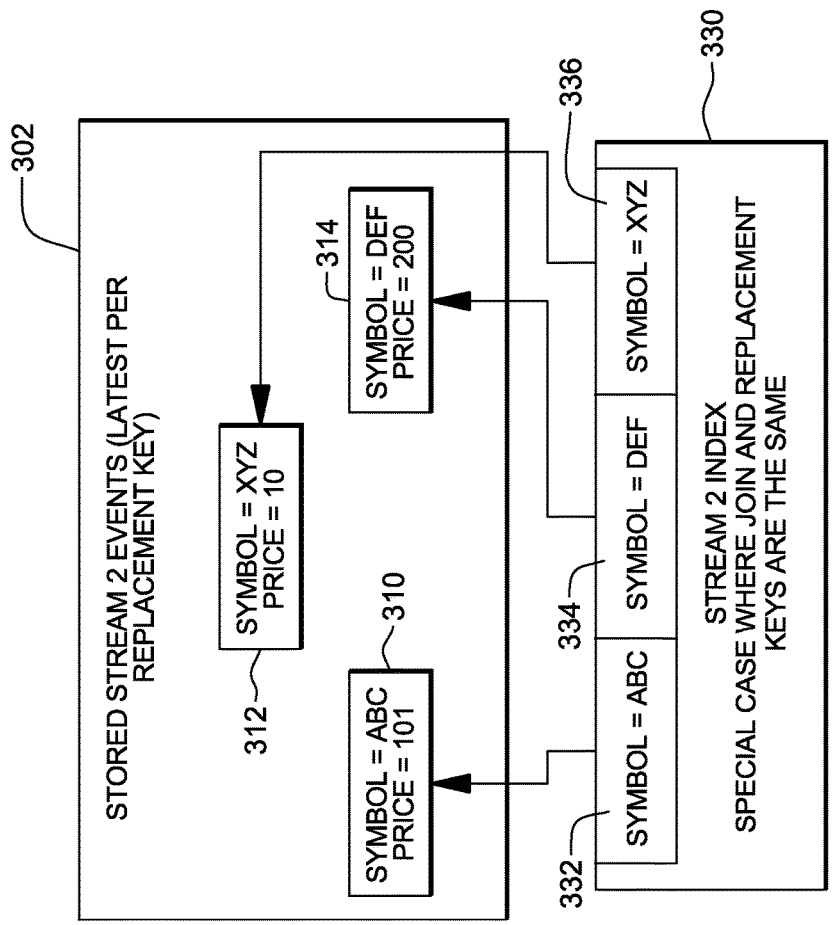

In one embodiment, the latest events per unique key are stored in one or more data structures. As examples, these data structures are used to keep track of which events have arrived, but have not yet been replaced, and for quickly looking up the events based on the attributes used for correlation. As depicted in FIGS. 3A-3B, one data structure used is a Stored Stream 1 Events data structure 300 (FIG. 3A) and another data structure used is a Stored Stream 2 Events data structure 302 (FIG. 3B). These data structures are used to store an event's value, in response to the arrival of that event, until the event is removed or replaced by a newer event with the same unique key. In each of these data structures, there is at most one event for a given unique key value (e.g., the most recent one for a particular entity).

Data structure 300 includes, for instance, records for Stream 1 events, including a record 304 for an event having unique key Order ID=1, as well as records 306 and 308 for unique key Order ID=2 and unique key Order ID=3, respectively. Each record includes, in this example, Order Id, Symbol, Num Fulfilled and Num Open.

To facilitate access to the data in data structure 300, a unique replacement index data structure 320 is provided that includes unique keys for Order ID=1 (322), Order ID=2 (324) and Order ID=3 (326). This data structure enables the finding of records in data structure 300 by unique index to allow replacement of records made obsolete by the arrival of a new event with the same unique key (i.e., an entity is uniquely identified by a key). Each record in the index points to the key's record in Stored Stream 1 Events data structure 300. While this embodiment uses a flat index, many different indexing techniques could be used in other embodiments.

Similarly, data structure 302 (FIG. 3B) includes, for instance, records for Stream 2 events, including a record 310 for unique key Symbol ABC, a record 312 for unique key Symbol XYZ, and a record 314 for unique symbol DEF. Each record includes, in this example, Symbol and Price.

To facilitate access to the data in data structure 302, a unique index data structure 330 is provided that includes unique keys for Symbol ABC (332), Symbol DEF (334), and Symbol XYZ (336). This data structure enables the finding of records in data structure 302 by unique index to allow replacement of records made obsolete by the arrival of a new event with the same unique key (i.e., an entity is uniquely identified by a key). Each record in the index points to the key's record in Stored Stream 2 Events data structure 302.

Returning to FIG. 3A, another data structure that is provided is a join key index data structure 340, which includes a plurality of records, in which each record includes one or more pointers to records in data structure 300. For example, record 342 has a pointer to record 308 having Symbol XYZ; and record 344 has two pointers, one to record 306 and the other to record 304, each having Symbol ABC. Symbol is included in the join key index, since the join condition is based on Symbol.

In FIG. 3B, the join and replacement keys are the same.

In a further embodiment, a removal index may be coupled to data structure 300 and/or data structure 302. This index is used to facilitate access to and removal of obsolete events in its corresponding data structure.

Figure 4:
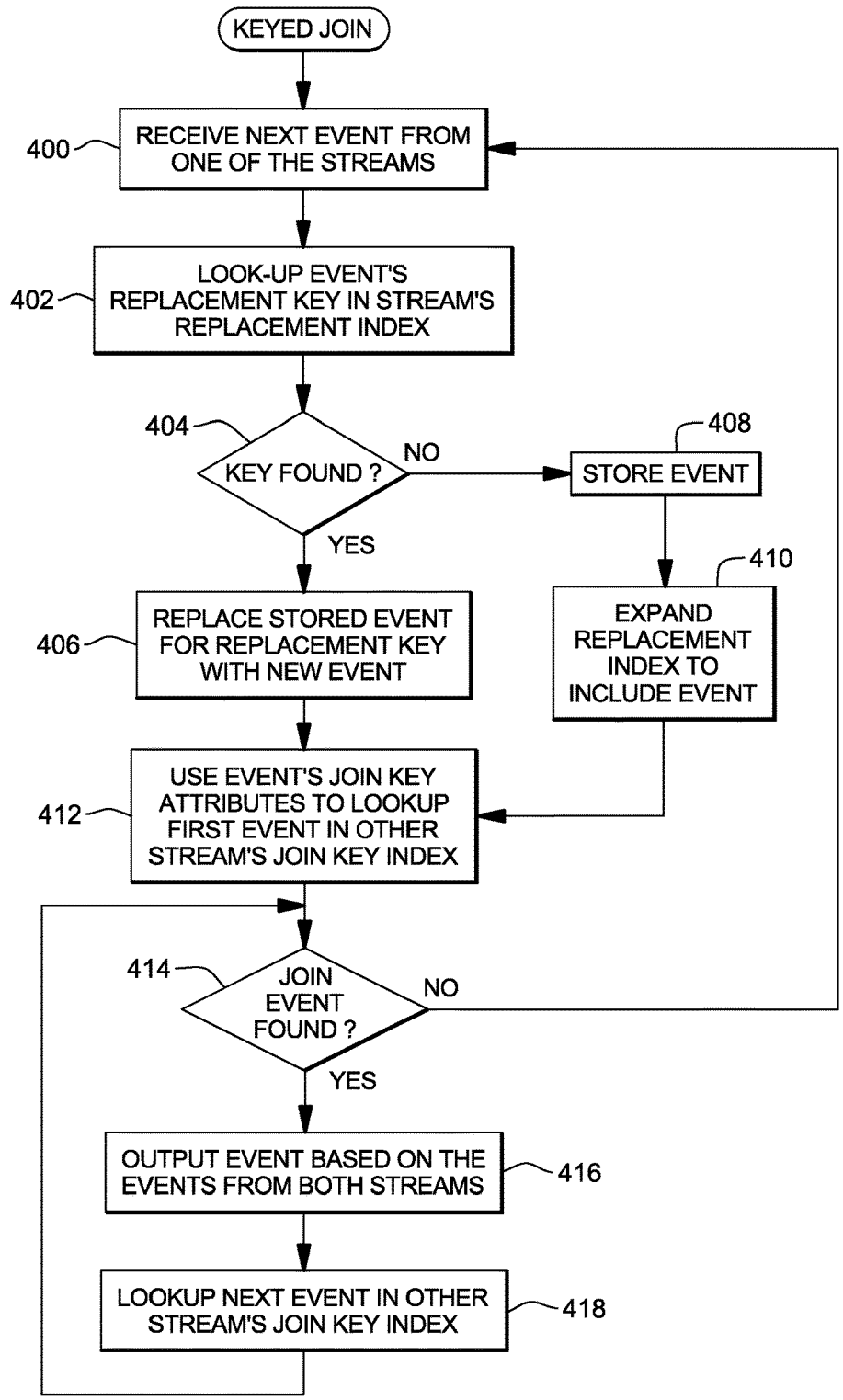
FIG. 4 depicts one embodiment of the logic to implement a keyed join operator, in accordance with an aspect of the present invention.
Figure 5A:
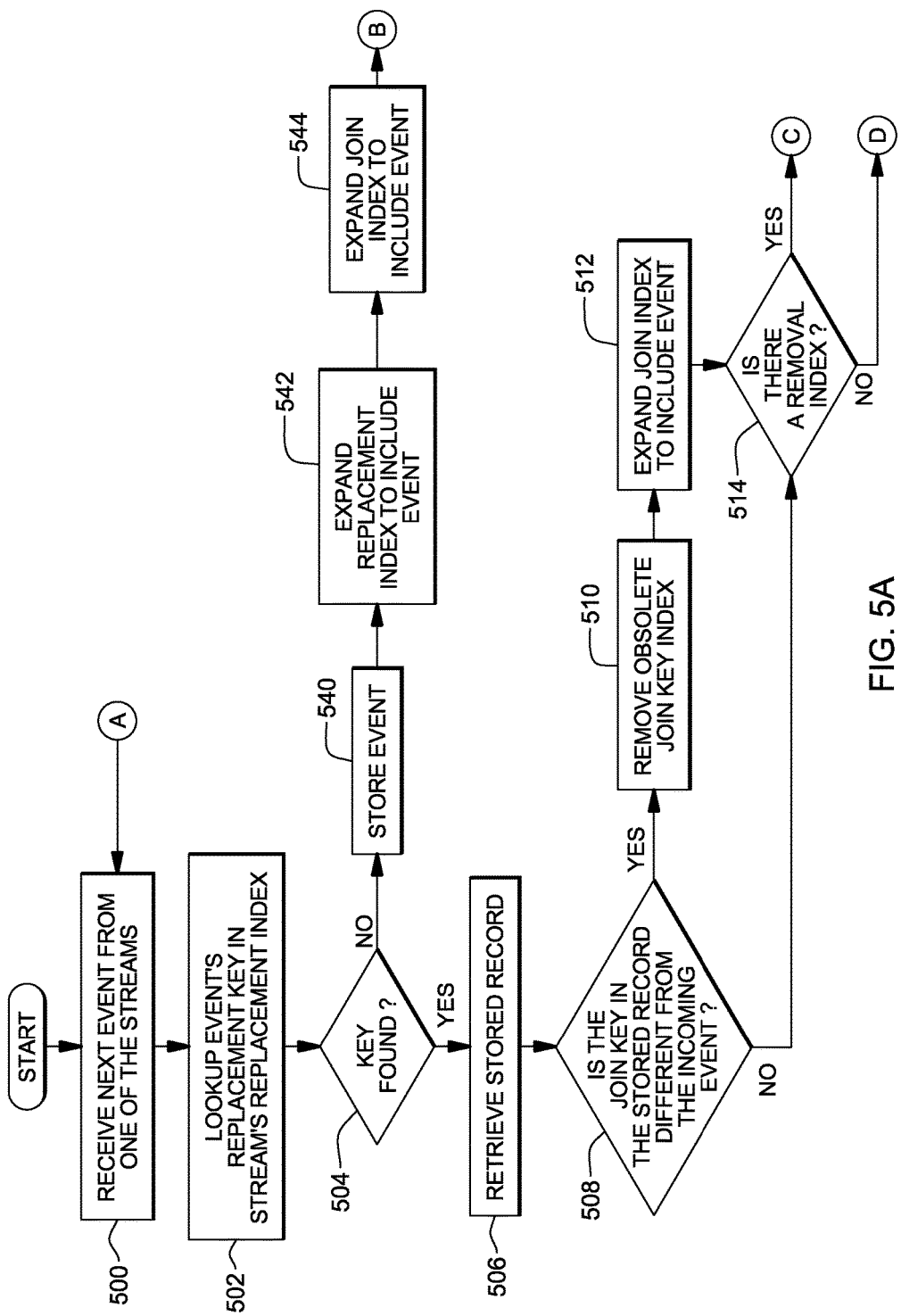
FIGS. 5A-5B depict another embodiment of the logic to implement a keyed join, in which removal of obsolete events is accommodated, in accordance with an aspect of the present invention.
Figure 5B:
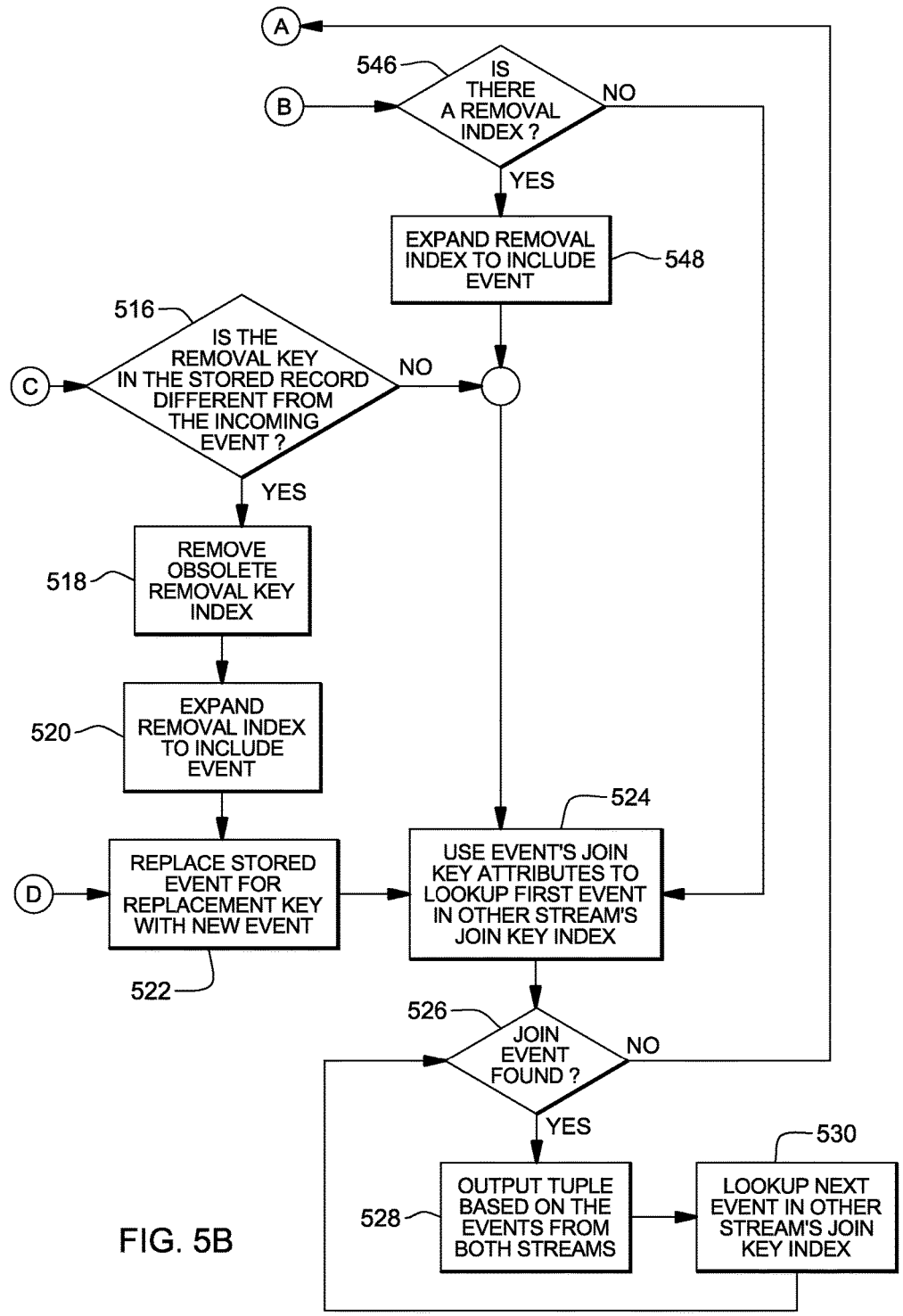
Figure 6:
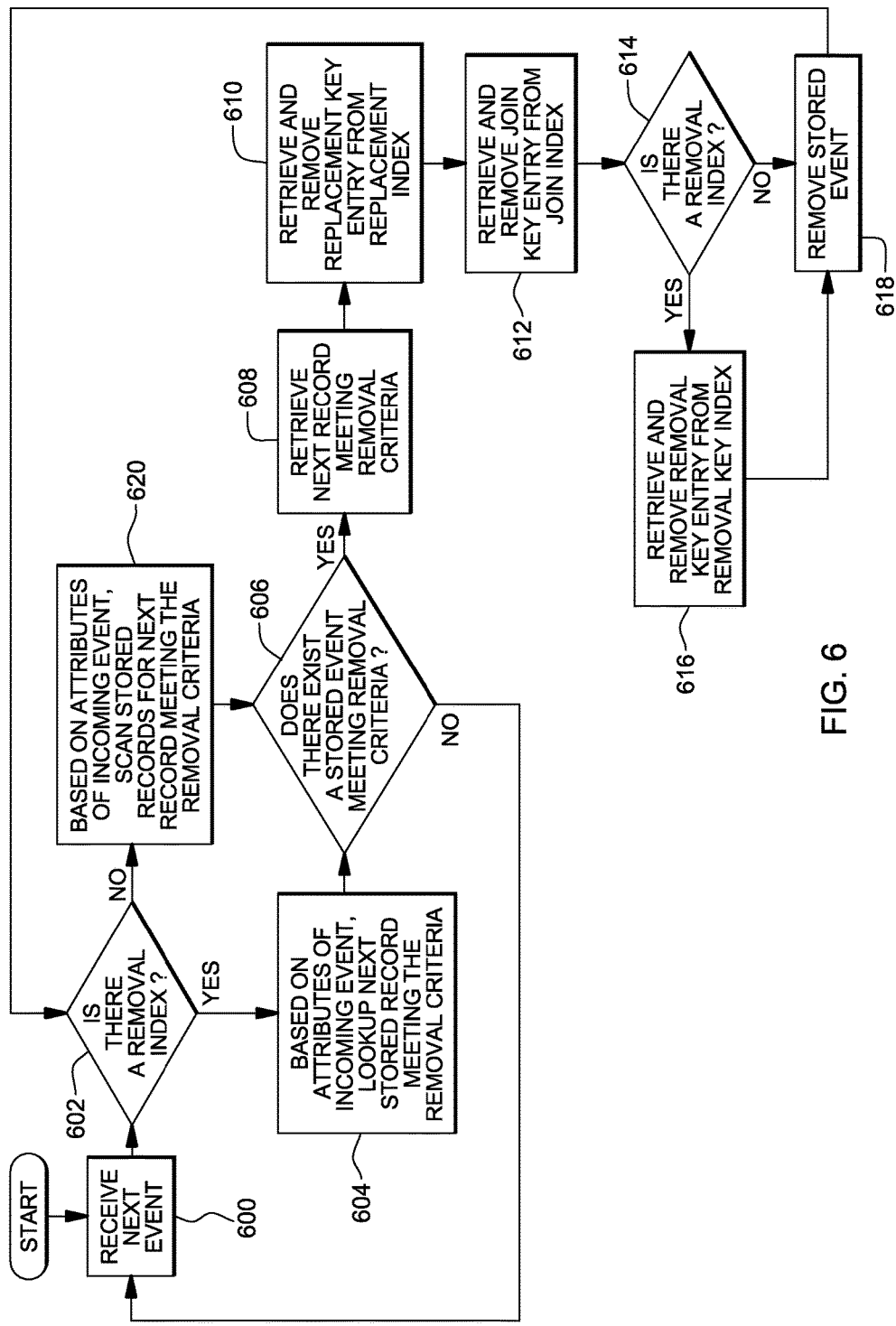
FIG. 6 depicts one embodiment of the logic to remove obsolete events, in accordance with an aspect of the present invention.

The use of these data structures in processing streaming data is described with reference to FIGS. 4-6. FIG. 4 depicts one embodiment of the logic associated with performing the keyed join operation, in accordance with an aspect of the present invention; FIGS. 5A-5B depict another embodiment of the logic associated with processing a keyed join operation, in which removal is accommodated, in accordance with an aspect of the present invention; and FIG. 6 depicts one embodiment of the logic associated with processing removal, in accordance with an aspect of the present invention. The logic of FIGS. 4-6 is performed, in one example, by the processor receiving the event.

Referring initially to FIG. 4, an event is received from a stream of data, (e.g., Stream 1 or Stream 2, or another stream—there can be more than two streams), STEP 400. The replacement key of that event is looked up in the replacement index data structure for that stream to determine if it is already there (e.g., being currently maintained in a join window), STEP 402. If the key is found, INQUIRY 404, then one or more attributes in the stored event for that replacement key are updated (e.g., Num Fulfilled and/or Num Open for Stream 1 are updated; or price for Stream 2), STEP 406. However, if the key is not found, then the event is stored in the appropriate Stored Events data structure, STEP 408. For example, a record that includes Order ID, Symbol, Num Fulfilled and Num Open is added to the data structure. Also, the event is added to the replacement index, STEP 410. For example, the unique key is added to the replacement index.

Subsequent to adding the event to the replacement index, STEP 410, or replacing the stored event, STEP 406, the incoming event's join key attributes are used to look up events in an another stream's join key index, STEP 412. If an event index meets with the operation's join criteria, INQUIRY 414, an event (e.g., record, tuple) is output using the requested expression specified, STEP 416. These expressions may use attributes from each of the two events being joined together. The event may be output for further processing, output to a user, output to a database, output to storage or other repositories, and/or output to another application or logic, as examples.

Thereafter, processing continues with STEP 418 and INQUIRY 414 to determine if there are any other join events. If there are no join events or no other join events, processing continues with STEP 400. This concludes join processing.

Another embodiment of keyed join operator is described with reference to FIGS. 5A-5B, which also takes into consideration removal. Referring to FIG. 5A, an event from one of the streams is received, STEP 500. A look-up of the replacement key of that event in the replacement index for that stream is performed, STEP 502. If the key is found, INQUIRY 504, the stored event is retrieved from the appropriate Stored Events data structure using the replacement key as an index into the Stored Events data structure, STEP 506. Further, a determination is made as to whether the join key in the retrieved stored event is different from the join key in the incoming event, INQUIRY 508. If it is different, then the obsolete join key is removed from the join key index, STEP 510, and the join key index accommodates the incoming event (i.e., the new join key), STEP 512.

Thereafter, or if the join key is the same, then a determination is made as to whether there is a removal index for this stream of data, INQUIRY 514. If so, a further determination is made as to whether the removal key in the stored record is different from the removal key in the incoming event, INQUIRY 516 (FIG. 5B). If it is different, then the obsolete removal key is removed from the removal index, STEP 518; and the new event is added to the removal index (i.e., the new removal key replaces the old removal key in the removal key index), STEP 520.

Thereafter, or if there is no removal index, the stored event for the replacement key is replaced with the new event, STEP 522. Further, the event's join key attributes are used to look up the first event (i.e., any event) in another stream's join key index, STEP 524. For each event index that meets with the operation's join criteria, INQUIRY 526, an event is output using the requested expression specified, STEPs 528, 530, 526. These expressions may use attributes from each of the two events being joined together. If there are no join events or no more join events, processing continues with STEP 500 (FIG. 5A).

Returning to INQUIRY 516 (FIG. 5B), if the removal key in the stored record is not different from the removal key of the incoming event, then processing continues with STEP 524.

Returning to INQUIRY 504 (FIG. 5A), if the key is not found in the replacement index, then the event is stored in the stream's Stored Events data structure, STEP 540. Further, the event is included in the replacement index, STEP 542, and the join index, STEP 544, assuming separate indices. Moreover, a determination is made as to whether there is a removal index, STEP 546 (FIG. 5B). If not, then processing continues with STEP 524. However, if there is a removal index, then the event is included in that index, as well, STEP 548. This concludes join processing with removal.

One embodiment of the logic to remove an event from a data structure is described with reference to FIG. 6. Removal may be performed prior to correlation, when a pre-removal condition is specified; and performed after correlation, when a post-removal condition is specified. Therefore, the logic of FIG. 6 can be performed before or after the logic of FIGS. 5A-5B (or FIG. 4).

Referring to FIG. 6, an event is received, STEP 600. A determination is made as to whether there is a removal index specified for this stream of events, INQUIRY 602. If there is a removal index, then based on the attributes of the incoming event, a lookup is performed for the next stored record meeting the removal criteria, STEP 604. (The removal criteria may be based on attributes and/or any needed values accessible from the operator. An example of a value accessible from the operator could be the number of records processed by the operator.)

If there does not exist a stored event meeting the removal criteria, INQUIRY 606, processing continues with STEP 600. However, if there does exist a stored event meeting the removal criteria, then the next record meeting the removal criteria is retrieved, STEP 608. Additionally, a replacement key entry for this event is retrieved and removed from the replacement index, STEP 610; and a join key entry for this event is retrieved and removed from the join key index, STEP 612. Additionally, a determination is made as to whether there is a removal index, INQUIRY 614. If so, then the removal key entry for this event is retrieved and removed from the removal key index, STEP 616. Thereafter, or if there is no removal index, the stored event is removed, STEP 618, and processing continues with INQUIRY 602.

Returning to INQUIRY 602, if there is no removal index, then based on the attributes of the incoming event, the stored records in the stream's data structure are scanned for the next record meeting the removal criteria, STEP 620. Processing then continues with INQUIRY 606. This concludes the removal processing.

In accordance with one or more aspects of the present invention, a model is provided where applications are constructed based on operators (e.g., a keyed join operator), where each operator takes in one or more streams of events (or records) and outputs one or more streams of events. By piecing together these operators based on the streams they use, a full stream processing application can be constructed. These applications can be created by a user using a programming language created to describe these operators and their input and output streams. Alternatively, a graphical user interface with drag and drop along with input wizards can be used to create these same applications.

As one example, the keyed join operator described above can be specified in a programming language geared towards streaming applications (e.g., the SPADE programming language offered by International Business Machines Corporation described in Gedik et al. in "SPADE: The System S Declarative Stream Processing Engine," SIGMOD Conference 2008: 1123-1134). The language includes built-in, as well as user-defined, operators, which take in streams and output streams.

One embodiment of the syntax for a keyed join is as follows, for one particular example:

```
stream OrdersWithCurrentPrices (
    schemaFor (Orders),
    schemaFor (MarketTicker),
    OpenValue : Float) :=
KeyedJoin ( Orders; MarketTicker )
    [ JoinCondition: $1.Symbol = $2.Symbol;
      ReplacementKey1: $1.OrderID;
      ReplacementKey2: $2.Symbol;
      PostRemovalCondition: NumOpen = 0 ]
{
    OpenValue := NumSharesOpen * LastPrice,
}
```

The syntax starts with the specification of an output stream. The output stream, in this example, is made up of the attributes that are also in the Orders stream (specified with the schemaFor keyword), the attributes that are in the MarketTicker stream (again specified with the schemaFor keyword), and an attribute called OpenValue which is of type Float. This output stream is then set to transport the results of an operator; in this case, the operator KeyedJoin. The operator has two input streams, Orders and MarketData, whose records are to be correlated with each other.

There are four parameters in the example that specify the details for how the operator is to function. The first parameter listed, JoinCondition, specifies when an incoming event from one of the input streams gets correlated with the stored events previously received from another stream. In the example, this condition specifies that the events from the two streams get correlated when the values of their Symbol attributes are the same. The second parameter listed, ReplacementKey1, specifies what attributes within each arriving event of the first input stream (Orders) uniquely identify the entity for which the incoming record provides the new, up-to-date information. ReplacementKey2 specifies the attributes that uniquely identify the records from the second input stream, MarketTicker. The fourth parameter, PostRemovalCondition, is a removal condition which specifies when an event should be removed from further correlations. In this example, these removals are performed after the incoming event causing the removal is correlated with the events stored for the other stream. To avoid this final correlation for the event being removed, the user can specify a PreRemovalCondition.

This is just one example of a possible syntax that describes the keyed join operator. There are many other potential syntactical variations and alternative specification mechanisms possible and the examples provided herein are for illustrative purposes only. Also, the KeyedJoin operator can have syntax and functional support for event windows, including time and count-based as well as others, which causes older events to be removed. The KeyedJoin operator can be generalized to support more than two input streams. It can also be generalized to support a mix of streams with key-based replacement and streams without any key-based replacement, as examples.

Described in detail above is at least one example of using a keyed join operator to minimize the amount of processing performed on events having a same key. In one example, the use of computational resources is limited through the use of ancillary indices. In other words, correlations are processed incrementally while being able to support event updates (i.e., replacement by an event with the same key). As events arrive, minimal additional processing is needed and full re-calculations are avoided. One or more embodiments of the invention may provide one or more beneficial technical effects, such as, for example, streamlined calculations with lower latency contributing to higher overall system throughput and decreased use of computational resources, such as memory and processor time. A join operator is used that allows a user to define the plurality of incoming streams (e.g., two), how they are updated, and how they are joined.

A stream processing platform, which includes applications having analytical operators, as described herein, is provided to enable better analysis with more data types for more informed, faster, differentiated decision making. One example of such a stream processing system is one that uses the INFOSPHERE STREAMS middleware application provided by International Business Machines Corporation. The stream processing platform according to one embodiment of the present invention may provide, for example:

An execution engine enabling aggressive production and management of knowledge and information from potentially enormous volumes of data
  digital audio, video and image data, instant messages, network packet traces, text and transactional data, and sensor data;
  new formats and protocols as they are developed.
A programming model in which individual stream processing analytics can:
  perform feature extraction, classification, aggregation and correlation, transformation, and data labeling;
  be composed in a distributed, adaptive, and self-organizing processing graph;
  in order to satisfy thousands of inquiries for relevant information from the available raw data sources.

Tools supporting analytic development, application composition, system monitoring, control, and debug.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Figure 7:
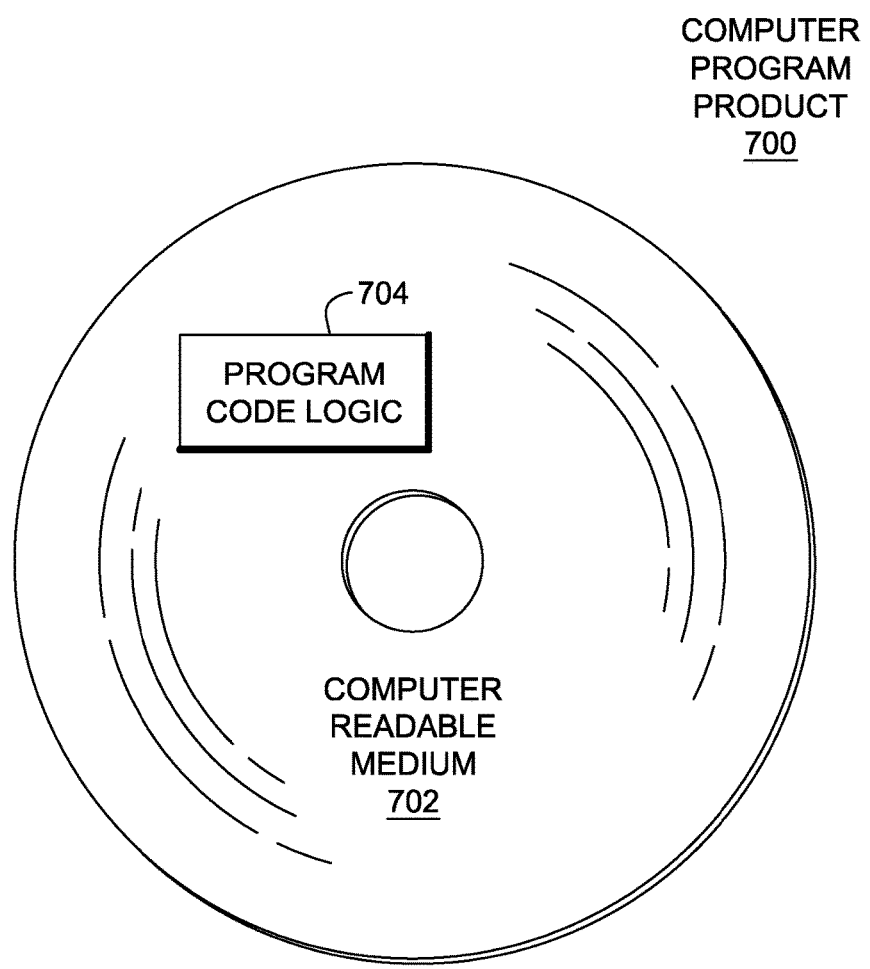
FIG. 7 depicts one embodiment of a computer program product incorporating one or more aspects of the present invention.

Referring now to FIG. 7, in one example, a computer program product 700 includes, for instance, one or more computer readable media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, a device coupled to a data processing system can perform one or more aspects of the present invention. Yet further, syntax other than that described herein can represent the operator to be executed. Still further, other operators may be implemented using one or more aspects of the present invention. Additionally, more, less or different data structures may be used; and/or the information in those structures may be different than described herein. Moreover, other formats of data structures or other structures may be used to store the desired information. The phrase "replacing the event" or "outputting the joined event" includes replacing or outputting, respectively, one or more (not necessarily all) characteristics, features, attributes and/or other representations of the event.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

A data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for processing streaming data in a data processing system, the computer program product comprising:
 a non-transitory computer readable storage medium for execution by a processing circuit for performing a method comprising:
  receiving at least a first stream of data and a second stream of data;
  maintaining a first stored event including a first replacement key and a second stored event including a second replacement key, the first stored event comprising a first set of updated attributes based on the first replacement key and the second stored event comprising a second set of updated attributes based on the second replacement key, the first stored event being an event of the first stream of data and the second stored event being an event of the second stream of data, and the first stored event and second stored event to be joined and output as part of a joined event;
  determining whether an arriving new event of the first stream of data includes the first replacement key included in the first stored event, the first stored event being received previous to receipt of the new event, wherein inclusion of the first replacement key in the new event indicates provision of updated information, in the new event, about the first stored event;
  in response to determining that the new event includes the first replacement key, replacing the first stored event with the new event as the event to be joined and output with the second stored event as part of the joined event, wherein the replacing comprises changing at least one attribute of the first set of updated attributes of the first stored event to match at least one attribute of one or more attributes of the new event, wherein the chancing replaces information in the first stored event with information provided by the new event, to store the new event as the first stored event;
  based on the replacing, checking a join key index data structure associated with the second stream of data to determine whether the join key index data structure indicates one or more associations between a join key attribute of the first stored event and one or more events of the second stream of data, including the second stored event, wherein an association indicates that output of the joined event is to automatically occur, and wherein the join key index data structure is a separate data structure from a stored event data structure in which the one or more events of the second stream of data are stored; and
  based on determining that an association between the join key attribute of the first stored event and the second stored event is indicated, the association indicating that a match is present between the join key attribute of the first stored event and one or more attributes of the second stored event, automatically outputting the joined event, the automatically outputting being triggered on the basis of arrival of the new event with the updated information, on the basis of the association between the join key attribute of the first stored event and the second stored event being indicated, and on the basis of the second stored event having been received and maintained as the second stored event and causing inclusion of the join key attribute in the join key index data structure, the outputting joining the first stored event and the second stored event to provide the joined event, wherein, in response to the replacing, the first stored event being joined is an updated event, and wherein the joined event comprises the changed at least one attribute of the first set of updated attributes of the first stored event, and comprises one or more attributes of the second set of updated attributes of the second stored event.

2. The computer program product of claim 1, wherein the first replacement key included in the new event uniquely identifies an entity to which the new event corresponds, and wherein the replacing further comprises:
 locating, in a stored event data structure, the first stored event in the stored event data structure, the stored event data structure maintaining, for each unique entity of one or more unique entities, and based on a replacement key that uniquely identifies the unique entity, a latest received event associated with the unique entity, wherein the first stored event is the latest event associated with the unique entity identified by the first replacement key; and performing the changing of the at least one attribute of the first set of updated attributes of the first stored event to be joined and output.

3. The computer program product of claim 2, wherein the locating comprises using the first replacement key uniquely identifying the entity as an index into the stored event data structure to locate the latest event maintained therein, the first replacement key being maintained as an index in an index data structure coupled to the stored event data structure.

4. The computer program product of claim 1, wherein the receiving comprises receiving the first stored event and in response to receiving the first stored event, determining whether the first replacement key included in the first stored event is being maintained in an index data structure for maintaining unique keys as indices into the stored event data structure storing events to be output; and in response to determining the first replacement key included in the first stored event is not being maintained in the index data structure:
storing the first stored event in the stored event data structure as the event to be joined and output as part of the joined event; and
adding the first replacement key of the first stored event to the index data structure.

5. The computer program product of claim 1, wherein the method further comprises:
using the join key attribute associated with the first stored event and the second stored event to determine that the first stored event and the second stored event are to be joined.

6. The computer program product of claim 1, wherein the method further comprises removing an event from a stored event data structure, in response to an indication that the event is to be removed.

7. The computer program product of claim 6, wherein the removing is performed prior to joining the event to be removed with another event.

8. The computer program product of claim 1, wherein the method further comprises maintaining the second stored event based on the second replacement key, wherein newly received events comprising the second replacement key comprise updated information about the second stored event and wherein the second stored event is replaced with the newly received events, in which at least one attribute of the second set of updated attributes of the second stored event are changed to match at least one attribute of one or more attributes of the newly received events; and wherein the joined event comprises the changed at least one attribute of the first set of updated attributes of the first stored event and comprises the changed at least one attribute of the second set of updated attributes of the second stored event.

9. The computer program product of claim 1, wherein the one or more attributes of the second set of updated attributes of the second stored event, which are included in the joined event, comprise attributes, of the second stored event, that are updated based on receiving a new event having the second replacement key and changing the one or more attributes of the second set of updated attributes of the second stored event to match attributes included in the new event having the second replacement key, wherein the joined event comprises the changed one or more attributes of the second set of updated attributes of the second stored event.

10. A computer system for processing streaming data in a data processing system, the computer system comprising:
a memory; and
a processor in communication with the memory, wherein the computer system is capable of performing a method, said method comprising:
receiving a first stream of data and a second stream of data;
maintaining a first stored event including a first replacement key and a second stored event including a second replacement key, the first stored event comprising a first set of updated attributes based on the first replacement key and the second stored event comprising a second set of updated attributes based on the second replacement key, the first stored event being an event of the first stream of data and the second stored event being an event of the second stream of data, and the first stored event and second stored event to be joined and output as part of a joined event;
determining whether an arriving new event of the first stream of data includes the first replacement key included in the first stored event, the first stored event being received previous to receipt of the new event, wherein inclusion of the first replacement key in the new event indicates provision of updated information, in the new event, about the first stored event;
in response to determining that the new event includes the first replacement key, replacing the first stored event with the new event as the event to be joined and output with the second stored event as part of the joined event, wherein the replacing comprises changing at least one attribute of the first set of updated attributes of the first stored event to match at least one attribute of one or more attributes of the new event, wherein the changing replaces information in the first stored event with information provided by the new event, to store the new event as the first stored event;
based on the replacing, checking a join key index data structure associated with the second stream of data to determine whether the join key index data structure indicates one or more associations between a join key attribute of the first stored event and one or more events of the second stream of data, including the second stored event, wherein an association indicates that output of the joined event is to automatically occur, and wherein the join key index data structure is a separate data structure from a stored event data structure in which the one or more events of the second stream of data are stored; and
based on determining that an association between the join key attribute of the first stored event and the second stored event is indicated, the association indicating that a match is present between the join key attribute of the first stored event and one or more attributes of the second stored event, automatically outputting the joined event, the automatically outputting being triggered on the basis of arrival of the new event with the updated information, on the basis of the association between the join key attribute of the first stored event and the second stored event being indicated, and on the basis of the second stored event having been received and maintained as the second stored event and causing inclusion of the join key attribute in the join key index data structure, the outputting joining the first stored event and the second stored event to provide the joined event, wherein, in response to the replacing, the first stored event being joined is an updated event, and wherein the joined event comprises the changed at least one attribute of the first set of updated attributes of the first stored event, and comprises one or more attributes of the second set of updated attributes of the second stored event.

11. The computer system of claim 10, wherein the method further comprises:
using the join key attribute associated with the first stored event and the second stored event to determine that the first stored event and the second stored event are to be joined.

12. The computer system of claim 10, wherein the method further comprises removing an event from a stored event data structure, in response to an indication that the event is to be removed.

13. The computer system of claim 10, wherein the method further comprises maintaining the second stored event based on the second replacement key, wherein newly received events comprising the second replacement key comprise updated information about the second stored event and wherein the second stored event is replaced with the newly received events, in which at least one attribute of the second set of updated attributes of the second stored event are changed to match at least one attribute of one or more attributes of the newly received events; and wherein the joined event comprises the changed at least one attribute of the first set of updated attributes of the first stored event and comprises the changed at least one attribute of the second set of updated attributes of the second stored event.

14. The computer system of claim 10, wherein the one or more attributes of the second set of updated attributes of the second stored event, which are included in the joined event, comprise attributes, of the second stored event, that are updated based on receiving a new event having the second replacement key and changing the one or more attributes of the second set of updated attributes of the second stored event to match attributes included in the new event having the second replacement key, wherein the joined event comprises the changed one or more attributes of the second set of updated attributes of the second stored event.

15. A method of processing streaming data in a data processing system, said method comprising:
receiving, by a processor of the data processing system, a first stream of data and a second stream of data;
maintaining a first stored event including a first replacement key and a second stored event including a second replacement key, the first stored event comprising a first set of updated attributes based on the first replacement key and the second stored event comprising a second set of updated attributes based on the second replacement key, the first stored event being an event of the first stream of data and the second stored event being an event of the second stream of data, and the first stored event and second stored event to be joined and output as part of a joined event;
determining, by the processor, whether an arriving new event of the first stream of data includes the first replacement key included in the first stored event, the first stored event being received previous to receipt of the new event, wherein inclusion of the first replacement key in the new event indicates provision of updated information, in the new event, about the first stored event;
in response to determining that the new event includes the first replacement key, replacing, by the processor, the first stored event with the new event as the event to be joined and output with the second stored event as part of the joined event, wherein the replacing comprises changing at least one attribute of the first set of updated attributes of the first stored event to match at least one attribute of one or more attributes of the new event, wherein the changing replaces information in the first stored event with information provided by the new event, to store the new event as the first stored event;
based on the replacing, checking a join key index data structure associated with the second stream of data to determine whether the join key index data structure indicates one or more associations between a join key attribute of the first stored event and one or more events of the second stream of data, including the second stored event, wherein an association indicates that output of the joined event is to automatically occur, and wherein the join key index data structure is a separate data structure from a stored event data structure in which the one or more events of the second stream of data are stored; and
based on determining that an association between the join key attribute of the first stored event and the second stored event is indicated, the association indicating that a match is present between the join key attribute of the first stored event and one or more attributes of the second stored event, automatically outputting the joined event, the automatically outputting being triggered on the basis of arrival of the new event with the updated information, on the basis of the association between the join key attribute of the first stored event and the second stored event being indicated, and on the basis of the second stored event having been received and maintained as the second stored event and causing inclusion of the join key attribute in the join key index data structure, the outputting joining the first stored event and the second stored event to provide the joined event, wherein, in response to the replacing, the first stored event being joined is an updated event, and wherein the joined event comprises the changed at least one attribute of the first set of updated attributes of the first stored event, and comprises one or more attributes of the second set of updated attributes of the second stored event.

16. The method of claim 15, wherein the method further comprises:
using the join key attribute associated with the first stored event and the second stored event to determine that the first stored event and the second stored event are to be joined.

17. The method of claim 15, further comprising removing an event from a stored event data structure, in response to an indication that the event is to be removed.

18. The method of claim 15, wherein the method further comprises maintaining the second stored event based on the second replacement key, wherein newly received events comprising the second replacement key comprise updated information about the second stored event and wherein the second stored event is replaced with the newly received events, in which at least one attribute of the second set of updated attributes of the second stored event are changed to match at least one attribute of one or more attributes of the newly received events; and wherein the joined event comprises the changed at least one attribute of the first set of updated attributes of the first stored event and comprises the changed at least one attribute of the second set of updated attributes of the second stored event.

19. The method of claim 15, wherein the one or more attributes of the second set of updated attributes of the second stored event, which are included in the joined event, comprise attributes, of the second stored event, that are updated based on receiving a new event having the second replacement key and changing the one or more attributes of the second set of updated attributes of the second stored event to match attributes included in the new event having the second replacement key, wherein the joined event comprises the changed one or more attributes of the second set of updated attributes of the second stored event.

* * * * *